J. T. & O. G. WAGERS.
Gate.

No. 225,086. Patented Mar. 2, 1880.

Witnesses:
J. W. Garner
W. W. Mortimer

Inventors.
J. T. Wagers
O. G. Wagers
per
F. A. Lehmann, atty.

UNITED STATES PATENT OFFICE.

JOHN T. WAGERS AND OWEN G. WAGERS, OF STEWARTSVILLE, MISSOURI.

GATE.

SPECIFICATION forming part of Letters Patent No. 225,086, dated March 2, 1880.

Application filed December 22, 1879.

*To all whom it may concern:*

Be it known that we, JOHN T. WAGERS and OWEN G. WAGERS, of Stewartsville, in the county of De Kalb and State of Missouri, have invented certain new and useful Improvements in Adjustable Gate - Supporter and Double Latch Combined; and we do hereby declare the following to be a full, clear, and exact description of the invention, such as will enable others skilled in the art to which it pertains to make and use it, reference being had to the accompanying drawings, which form part of this specification.

Our invention relates to an improvement in gates; and it consists in forming the latch of the gate in two parts, and having their inner ends bear against each other, and connecting to the shorter end of one of these pivoted latches the cords, wires, or chains which extend from the inner and upper corner of the gate, and which are intended not only to take up the sag of the gate, but hold its free end raised above the ground, and thus the weight of the gate is made to operate the latch, as will be more fully described hereinafter.

Figure 1:
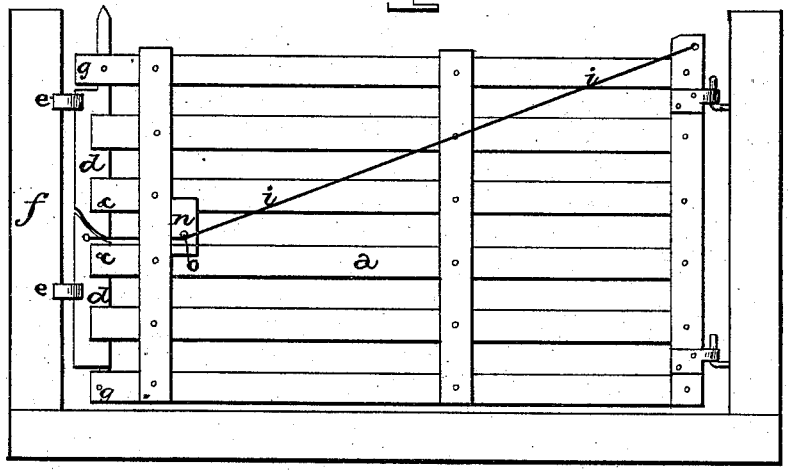
Figure 2:
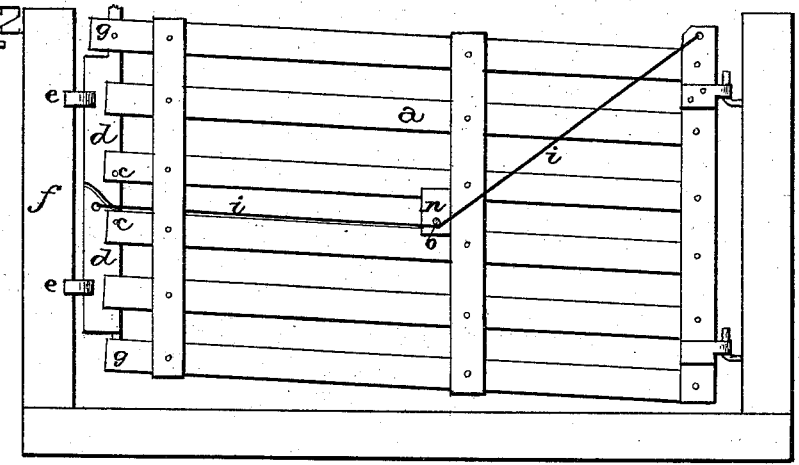
Figure 3:
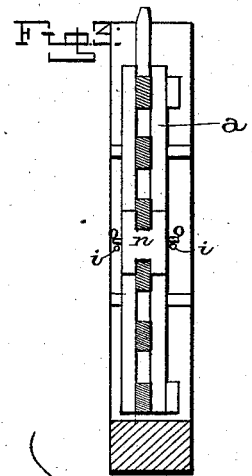

Figure 1 is a side elevation of the gate with its free end in the natural position, and Fig. 2 is a similar view with the free end raised. Fig. 3 is a vertical cross-section of the same.

*a* represents an ordinary gate, which is adapted to be raised upward at its free end in the usual manner. Pivoted at *c c* on the free end of the gate are the two parts *d* of the latch, the inner ends of which are shaped to bear against each other, while the outer ends reach to the two corners of the gate, where their outer edges catch in the catches *e* on the post *f*, for the purpose of latching the gate at both top and bottom.

At each corner of the outer end of the gate is formed a guide, *g*, for keeping the outer ends of these two parts of the latch in place.

Secured to the upper and inner corner of the gate are the two wires, cords, or chains *i*, one of which passes along each side of the gate down under the projections *o* on the sliding block *n*, and have their outer ends fastened to the shorter end of one of the parts of the latch, as shown. These wires or chains are intended to take up the sag of the gate, and to hold the outer end of the gate in a raised position, and always exert enough pressure on the two parts of the latch to hold the inner ends drawn inward and the outer ends forced outward, so as to force the outer ends into the two catches *e*.

When the sliding block *n*, which is made to fit and move back and forth between two of the panels of the gate, is moved outward as far as it will go toward the outer end of the gate, the wires or chains are just taut enough to counteract any tendency in the gate to sag and to keep the outer ends of the two parts of the latch forced outward, so as to always engage with the catches when the gate is closed.

In proportion as the sliding block is moved inward toward the center of the gate, so the projections *o* draw down on the wires or chains, and thereby raise the outer end of the gate upward, and hold it in that position, so as to pass over snow-drifts or let small animals pass under it; or when the gate is hung on the side of the hill this block can be adjusted so as to hold the gate at any desired angle. By thus attaching the brace wires or chains directly to the latch the weight of the gate acts like a spring upon them and causes them to always operate.

Having thus described our invention, we claim—

1. The combination of the gate, the latch, and the brace wires or chains connected to the latch, whereby the weight of the outer end of the gate is made to operate the latch, substantially as shown.

2. The combination of the gate, brace wires or chains, latch, and sliding block provided with projections to catch over the wires or chains, substantially as set forth.

In testimony that we claim the foregoing we have hereunto set our hands this 6th day of December, 1879.

JOHN T. WAGERS.
OWEN G. WAGERS.

Witnesses:
L. D. SMITH,
W. T. CLARK.